(12) United States Patent
Nielsen (10) Patent No.: US 6,339,437 B1
(45) Date of Patent: Jan. 15, 2002

(54) RELEVANCE-ENHANCED SCROLLING

(75) Inventor: Jakob Nielsen, Atherton, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 08/941,014

(22) Filed: Sep. 30, 1997

(51) Int. Cl.[7] .............................. G06F 3/14; G06F 17/30
(52) U.S. Cl. ....................................... 345/787; 345/968
(58) Field of Search ................................ 345/341, 973, 345/978, 339, 123, 124, 125, 348, 700, 727, 764, 765, 784–787, 830, 835, 839, 968; 707/3–7, 501, 513

(56) References Cited

U.S. PATENT DOCUMENTS

| 5,339,391 A | * | 8/1994 | Wroblewski et al. | 345/607 |
| 5,479,600 A | * | 12/1995 | Wroblewski et al. | 345/787 |
| 5,510,808 A | * | 4/1996 | Cina, Jr. et al. | 345/123 |
| 5,532,715 A | * | 7/1996 | Bates et al. | 345/684 |
| 5,533,182 A | * | 7/1996 | Bates et al. | 345/727 |
| 5,623,588 A | * | 4/1997 | Gould | 345/787 |
| 5,640,176 A | * | 6/1997 | Mundt et al. | 345/146 |
| 5,659,729 A | * | 8/1997 | Nielson | 707/3 |
| 5,659,732 A | | 8/1997 | Kirsch | 707/5 |
| 5,680,561 A | * | 10/1997 | Amro et al. | 345/787 |
| 5,757,370 A | * | 5/1998 | Amro et al. | 345/787 |
| 5,855,015 A | * | 12/1998 | Shoham | 707/5 |
| 5,867,678 A | * | 2/1999 | Amro et al. | 345/786 |
| 5,930,809 A | * | 7/1999 | Middlebrook | 345/780 |
| 5,946,678 A | * | 8/1999 | Aalbersberg | 707/3 |
| 6,101,503 A | * | 8/2000 | Cooper et al. | 707/104.1 |

FOREIGN PATENT DOCUMENTS

| EP | 0 459 174 A2 | 12/1991 |
| EP | 0 538 166 A2 | 4/1993 |
| WO | 93 15456 | 8/1993 |
| WO | WO 96/21901 | 7/1996 |

OTHER PUBLICATIONS

"Shading as a Frequency Indicator", IBM Technical Disclosure Bulletin, vol. 37, No. 01, Jan. 1, 1994, p. 527.

* cited by examiner

Primary Examiner—Crescelle N. dela Torre
(74) Attorney, Agent, or Firm—McDermott, Will & Emery (57) ABSTRACT

A graphical user interface enhances user information when scrolling through a document by determining the amount of relevant information at a particular scrolling location and changing one or more user perceptible system attributes such as color, sound or object displayed to reflect the amount of relevant information. In one approach, a <RELEVANT> tag or marker indicates relevance. Alternatively, adding an attribute to an existing HTML tag such as <STRONG> can indicate relevance. If information received from a search in response to a query contains no relevance indications, relevance markers are added locally.

17 Claims, 9 Drawing Sheets

| NUMBER OF RELEVANCE MARKERS | COLOR 1 (e.g. BLUE) | COLOR 2 (e.g. RED) |
|---|---|---|
| 0 | 100 | 0 |
| 1 | 90 | 10 |
| 2 | 80 | 20 |
| 3 | 70 | 30 |
| 4 | 60 | 40 |
| 5 | 50 | 50 |
| 6 | 40 | 60 |
| 7 | 30 | 70 |
| 8 | 20 | 80 |
| 9 | 10 | 90 |
| 10+ | 0 | 100 |

RELEVANCE-ENHANCED SCROLLING

BACKGROUND OF THE INVENTION

1. Field of the Invention

The invention relates to computer systems and, more particularly, to scrolling of displayed information in a way which reflects the relevance of the material at a particular point in the scroll.

2. Description of Related Art

Scrollbars are used in various software programs to enable a user to view different portions of long files. Some software programs add limited information to the scrollbar thumb. For example, some word processing software will display the current page number while the user is scrolling. However, this information does not indicate the relevance of the content visible at the scrolled location.

Programs and procedures that can find and mark relevant content in a document are known in the art. For example, many World Wide Web search engines, when responding to an information retrieval query, mark all occurrences of terms from the query in the documents with an HTML tag (typically STRONG).

The Problems

When scrolling through long document files users have no way of knowing where in the file relevant content is located. This requires users to stop scrolling at regular intervals to view the content to determine its relevance. This problem commonly occurs in browsers, in information retrieval systems, and in word processing programs.

SUMMARY OF THE INVENTION

The invention provides methods, apparatus, systems and computer program products which change a display of information, such as changing the appearance of a scroll bar thumb to reflect the amount of relevant content which would be visible in a display window at the current location of the scrolling thumb on the scrollbar. When a document is retrieved, it is examined for the presence of relevance markers which can be used to identify terms in the search query used to retrieve the document. These relevance markers can be applied either at the server prior to downloading to a user or at the user, if the search engine is not so equipped. Various algorithms can be used to map relevant content to a representation of the amount of relevant content in a way which can be perceived by a user.

The invention relates to a computer having a graphical user interface providing a visual indication of the presence of relevant information at different scrolling locations in a document.

The invention also relates to a computer configured to submit an information retrieval query, store the terms of that query in said memory and add one or more relevance markers to information retrieved in response to that query.

The invention also relates to a method of displaying information retrieved in response to a query by determining the amount of relevant information at a particular scrolling location and modifying a system attribute to indicate that amount of relevant information.

The invention also relates to a method of retrieving information by submitting a query to a search engine, retrieving information from said search engine in response to the query; and if information retrieved from said search engine contains no relevance markers, adding relevance markers to the information retrieved.

The invention also relates to a method of identifying relevant information retrieved in response to a query by identifying query terms in the information retrieved and inserting a relevance marker adjacent each query term identified.

The invention also relates to a method of identifying the amount of relevant information at a particular scrolling location by counting a number of relevance markers contained in the information displayed or that would be displayed at that location, and altering a system attribute to reflect said number.

The invention also relates to systems and computer program products for carrying out these techniques.

The foregoing and other features, aspects and advantages of the present invention will become more apparent from the following detailed description of the present invention when taken in conjunction with the accompanying drawings.

BRIEF DESCRIPTION OF THE DRAWINGS

The objects, features and advantages of the system of the present invention will be apparent from the following description in which.

NOTATIONS AND NOMENCLATURE

The detailed descriptions which follow may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operation of the present invention include general purpose digital computers or similar devices.

The present invention also relates to apparatus for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

DESCRIPTION OF THE PREFERRED EMBODIMENT

Figure 1A:
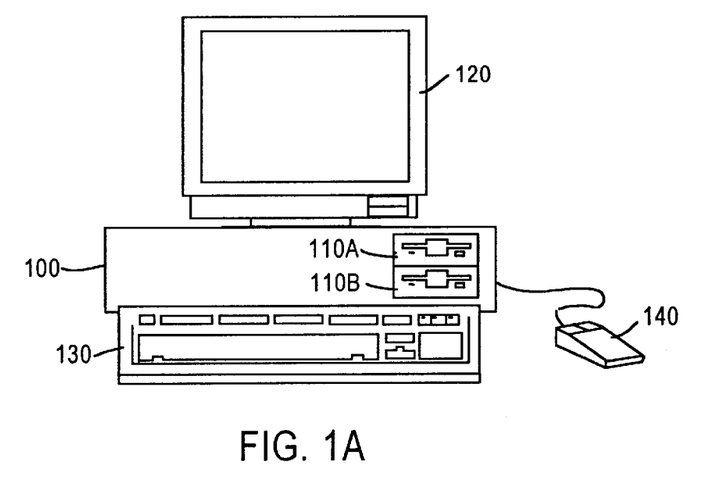
FIG. 1A is a view of exemplary computer system suitable for use in carrying out the invention.

FIG. 1A illustrates a computer of a type suitable for carrying out the invention. Viewed externally in FIG. 1A, a computer system has a central processing unit 100 having disk drives 110A and 110B. Disk drive indications 110A and 110B are merely symbolic of a number of disk drives which might be accommodated by the computer system. Typically, these would include a floppy disk drive such as 110A, a hard disk drive (not shown externally) and a CD ROM drive indicated by slot 110B. The number and type of drives varies, typically, with different computer configurations. The computer has the display 120 upon which information is displayed. A keyboard 130 and a mouse 140 are typically also available as input devices. Preferably, the computer illustrated in FIG. 1A is a SPARC workstation from Sun Microsystems, Inc.

Figure 1B:
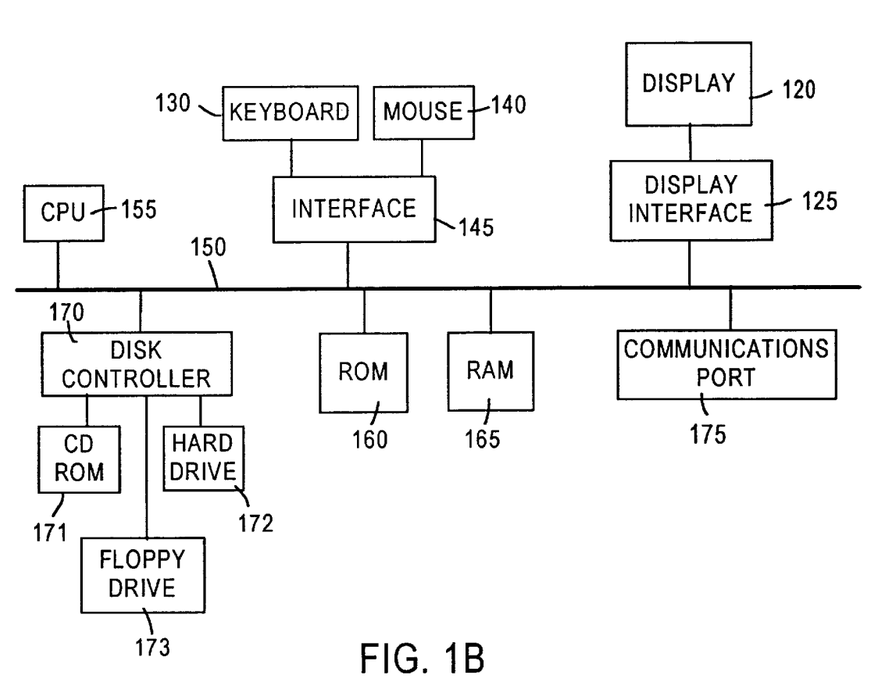
FIG. 1B is a block diagram of an exemplary hardware configuration of the computer of FIG. 1.

FIG. 1B illustrates a block diagram of the internal hardware of the computer of FIG. 1A. A bus 150 serves as the main information highway interconnecting the other components of the computer. CPU 155 is the central processing unit of the system, performing calculations and logic operations required to execute programs. Read only memory (160) and random access memory (165) constitute the main memory of the computer. Disk controller 170 interfaces one or more disk drives to the system bus 150. These disk drives may be floppy disk drives, such as 173, internal or external hard drives, such as 172, or CD ROM or DVD (Digital Video Disks) drives such as 171. A display interface 175 interfaces a display 120 and permits information from the bus to be viewed on the display. Communications with external devices can occur over communications port 185.

Figure 1C:
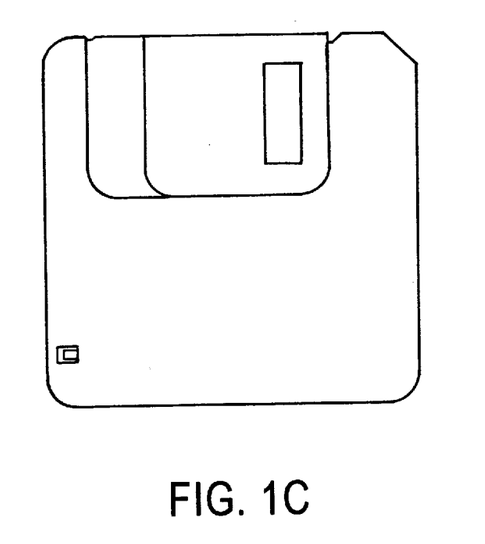
FIG. 1C is an illustration of an exemplary memory medium suitable for storing program and data information in accordance with the invention.

FIG. 1C illustrates an exemplary memory medium which can be used with drives such as 173 in FIG. 1B or 110A in FIG. 1A. Typically, memory media such as a floppy disk, or a CD ROM, or a Digital Video Disk will contain the program information for controlling the computer to enable the computer to perform its functions in accordance with the invention.

Figure 1D:
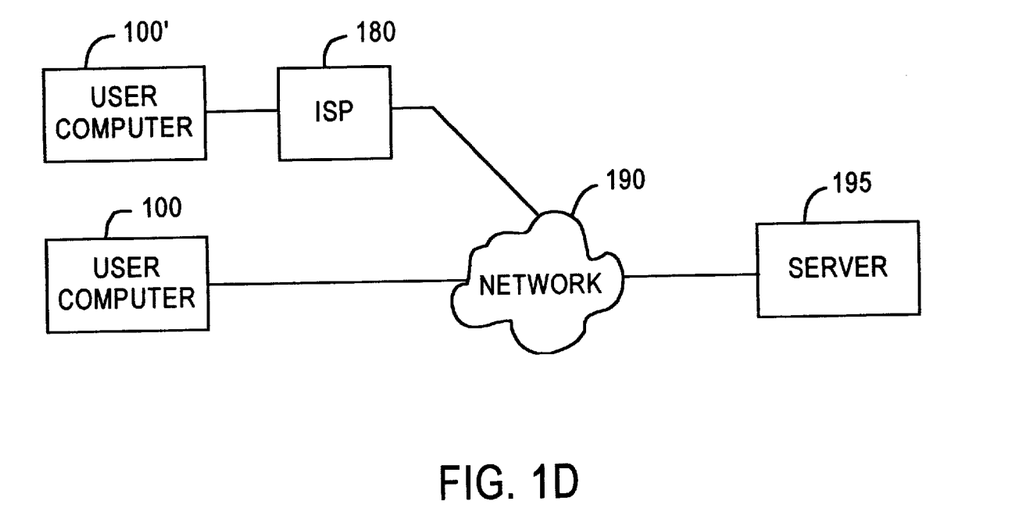
FIG. 1D is a block diagram of a network architecture suitable for carrying data and programs in accordance with some aspects of the invention.

FIG. 1D is a block diagram of a network architecture suitable for carrying data and programs in accordance with some aspects of the invention. A network 190 serves to connect a user computer 100 with one or more servers, such as server 195 for the download of program and data information. A user 100' can also connect to the network via a network service provider, such as ISP 180.

Figure 2A:
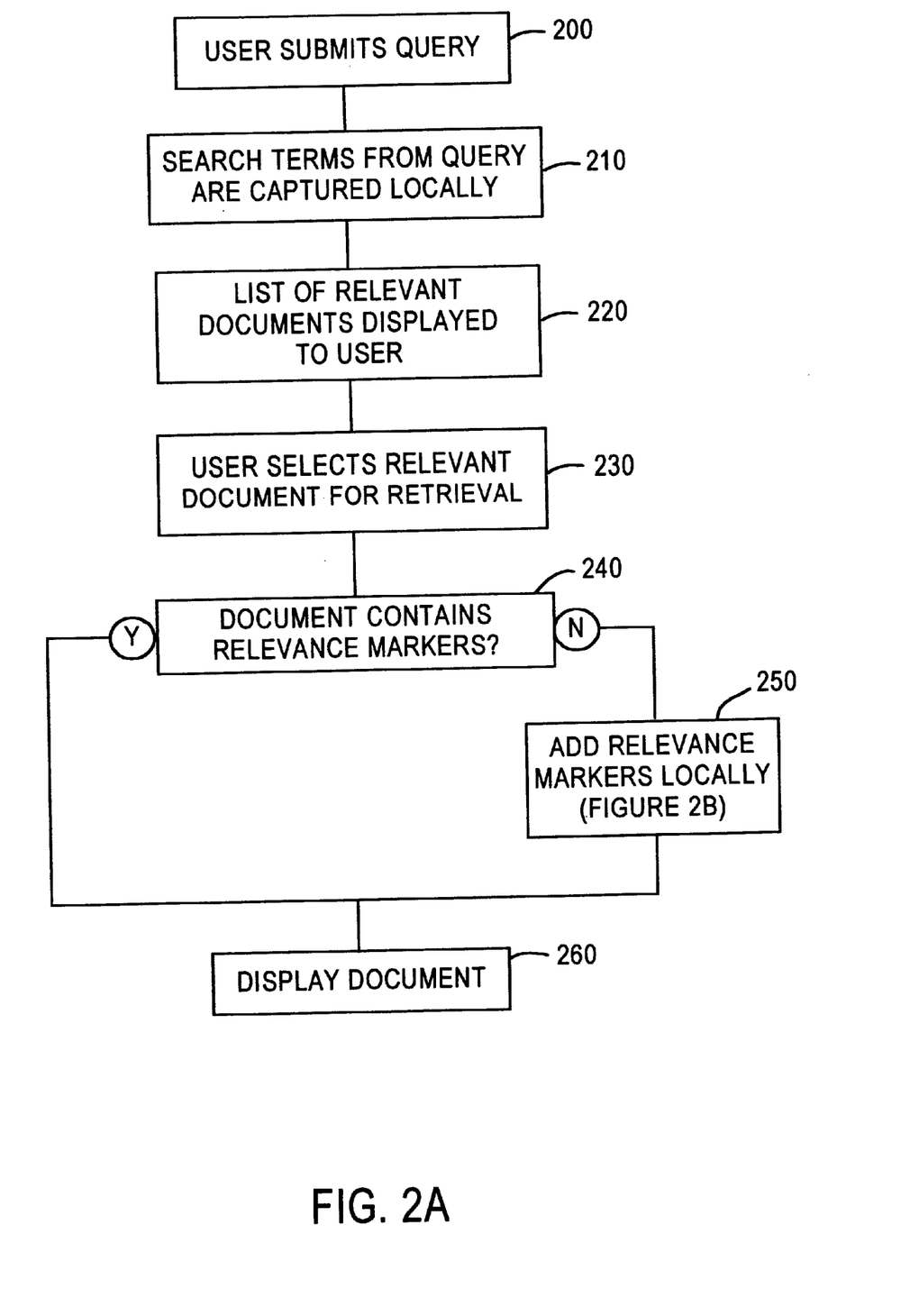
FIG. 2A is flow chart of an exemplary relevance enhanced scrolling process for displaying documents in accordance with one embodiment of the invention.

FIG. 2A is a flow chart of an exemplary relevance-enhanced scrolling process for displaying documents in accordance with one embodiment of the invention. When a user submits a query (200) such as might be done in an information retrieval system or, for example, when using a "find" command either within a word processing program or within a browser, the search terms from the query are captured (220) and stored locally (210). In systems where it is known that the server provides marking of query terms, this step is unnecessary. However, in an environment where some servers provide query term marking and others do not, a local capability for identifying relevant portions of a document is desirable. Storing the search terms permits this. In response to a query to an information retrieval system, a list of relevant documents, which contain one or more of the search terms are displayed to the user for the user's consideration. The user then selects one of the listed documents for retrieval (230). When the document is retrieved, it is examined to determine whether it contains relevance marking. If relevance marking is detected, the document is displayed (260) as discussed more hereinafter. If no relevance marking is detected (240-N), relevance markers are added locally as described more in conjunction with FIG. 2B (250).

In a preferred embodiment, an indication of how relevant a section of text is is based on the number of query terms found in that section of text. Other relevance indicators are also possible. For example, one could keep a count of the number of times a section of text was opened by a user (analogous to a well worn book falling open to one's favorite pages). Alternatively, an eyetracker could keep track of the sections of text of most interest to users, based on how long they considered the text.

Where a search engine provides relevance rankings based on a layer portion of text, such as a paragraph, one could use a summation of all relevance indicators for a section of text.

Figure 2B:
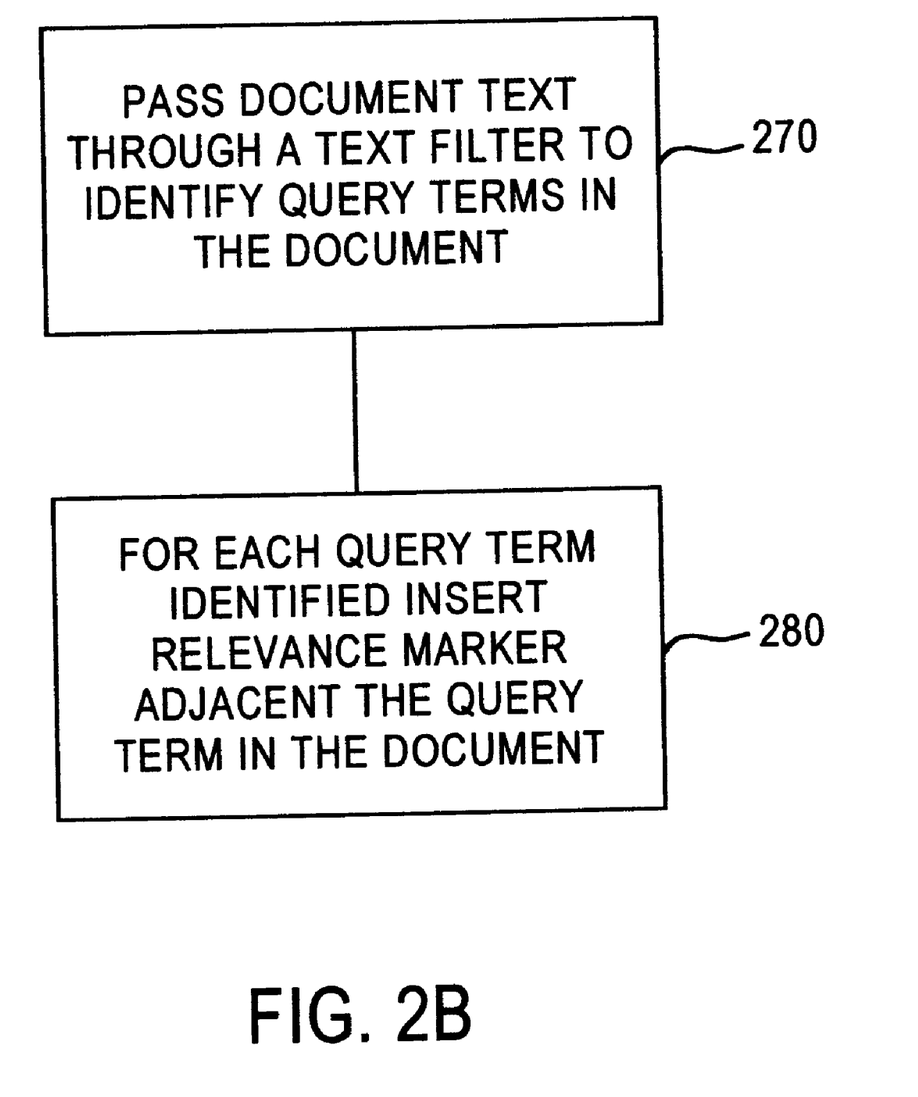
FIG. 2B is a flow chart of an exemplary process for adding relevance markers locally in accordance with one embodiment of the invention.

FIG. 2B is a flow chart of an exemplary process for adding relevance markers locally in accordance with one aspect of the invention.

As a document is retrieved after a query, the incoming text is examined to determine whether or not the document contains relevance markers adjacent to search terms. A similar process is undertaken with respect to locally applying relevance markers. The document text is examined and passed through a text filter to identify terms within the text which match one or more query terms (270). For each query term identified, a relevance marker is inserted adjacent to the query term in the document. Typically, a relevance marker might be the HTML tag <STRONG>. Existing search engines utilize this marker to identify terms from the query. However, the term <STRONG> is also used by authors to emphasize portions of their text. So by using the same HTML tag to identify query terms, one cannot distinguish between author emphasis and query term identification emphasis. To distinguish these conditions better, it is preferred to use a new relevance marker which, in the case of an HTML tag would be <RELEVANT>. One could also combine a relevance tag <RELEVANT> with an author generated tag <STRONG>. Once the local identification process illustrated in FIG. 2B is completed, a relevance-enhanced file will exist containing embedded relevance markers next to each query term.

Figure 3:
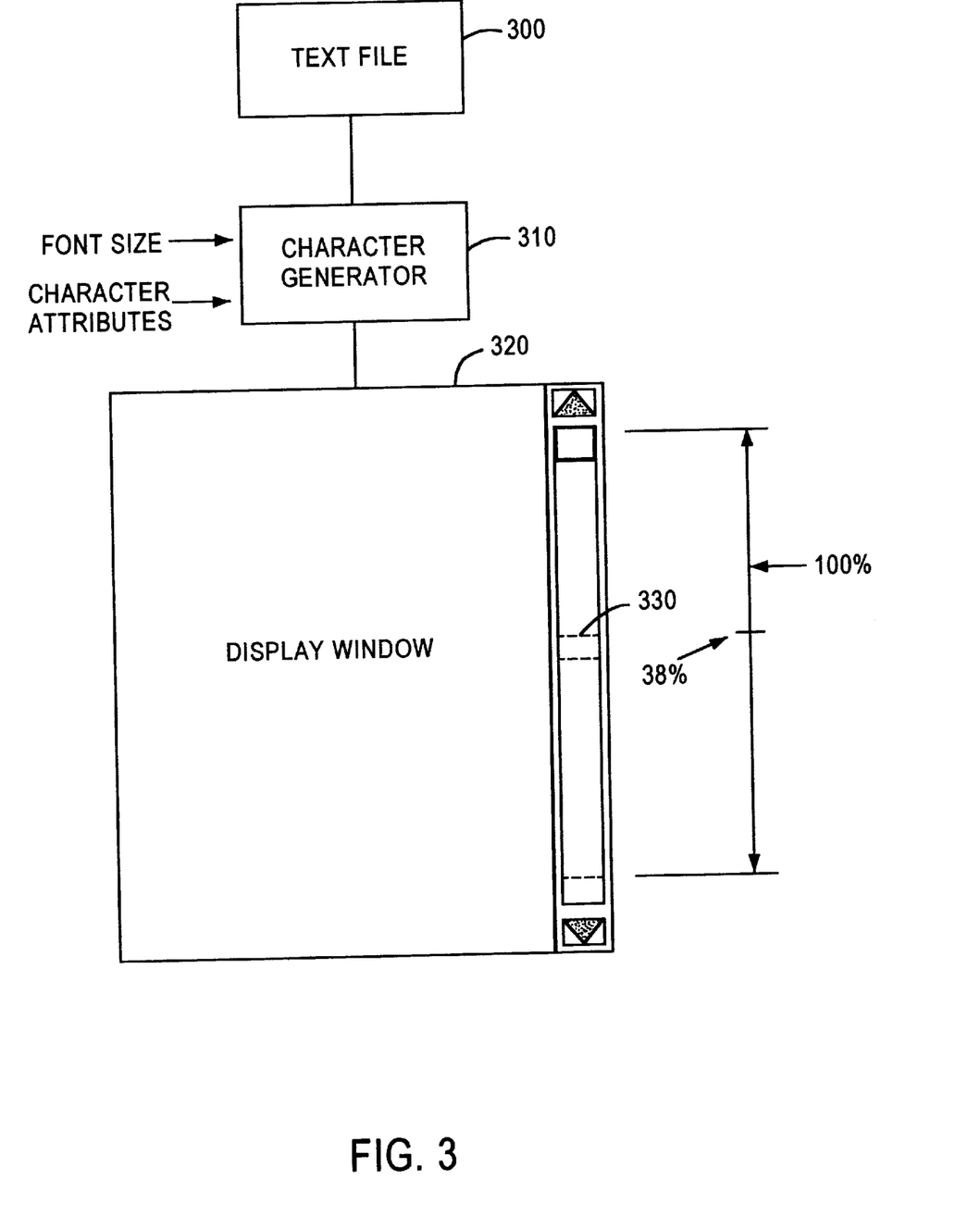
FIG. 3 illustrates the relationship between a text file, a character generator and a display window and its corresponding video buffer.

FIG. 3 illustrates a relationship between a text file, a character generator and a display window and its corresponding video buffer. Text files are typically represented as ASCII. Such a text file is illustrated at item 300. When a character is displayed on a screen, it is typically displayed as a matrix of pixels, for example, as a 6×9 pixel array. Since the display screen is made up of individual pixels, individual characters from a text file are translated into pixel arrays suitable for displaying the character on the screen by a character generator 310. Typically, the character generator can be controlled by setting attributes such as font size, font type, highlighting, blinking, pixel inversion or the like. Typically, a default font type and size is established for the display. However, this can be established by commands, for example HTML commands, embedded within the text. Also, it is typical that the default representations for terms which are marked as <STRONG> are pre-established. As text is read from the text file into the character generator, the HTML tag or other markers are read to identify the attributes with which a character or set of characters are to be represented. The character generator then responds to these marks and generates the appropriate character with the desired attributes. These are then displayed in a window. Typically, a window is a bit mapped representation in which the text will be displayed. Commonly, there is a display buffer which has a bit map 1 to 1 correspondence with the pixels of the display window. As shown in item 320 in FIG. 3, the right hand extent of the display window is occupied by a scroll bar in a well-known fashion. The range of scrolling available in the display window is shown and when a scroll bar is moved within the scrolling channel, the text from the text file that corresponds to a certain displacement of the scrolling thumb is displayed in the display window 320. In the example shown, scroll thumb position 330, shown in dashed lines, is displaced 38% from the top of the scroll bar toward the bottom. The underlying text, which would be displayed in the display window 320, is the text which corresponds approximately to text beginning 38% of the way through the text file 300.

Figure 4:
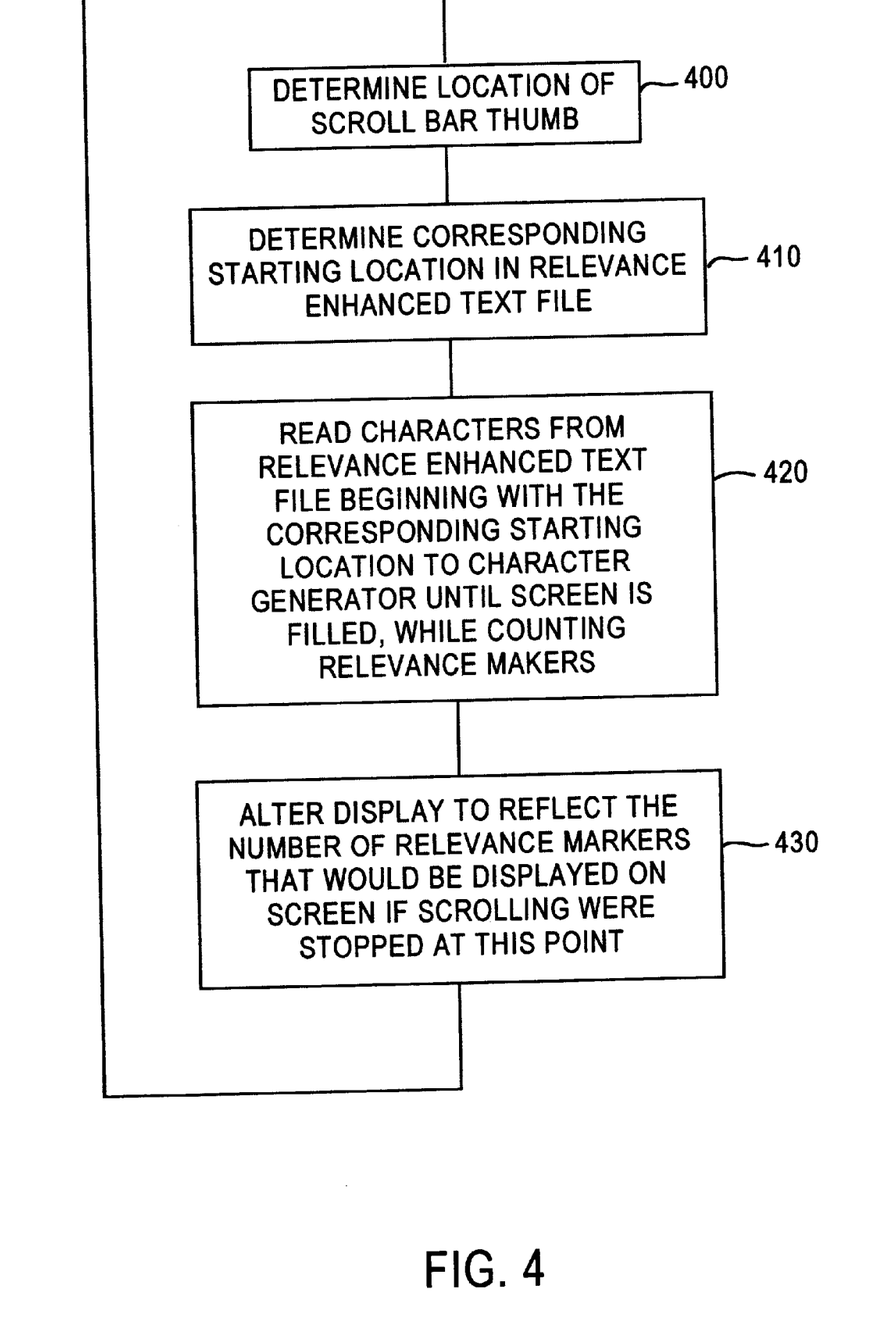
FIG. 4 is a flow chart of an exemplary relevance-enhanced scrolling process in accordance with one embodiment of the invention.

FIG. 4 is a flow chart of an exemplary relevance-enhanced scrolling process in accordance with one embodiment of the invention. First, a location of the scroll bar thumb, typically expressed as a percentage of the overall range of the scroll bar is determined (400) and a corresponding location in the relevance-enhanced text file is determined (410) as discussed above. Thus, as shown in FIG. 3, the scroll bar is displaced 38% of the linear distance constituting the range of scroll bar movement. Accordingly, the corresponding starting location in the relevance-enhanced text file would be approximately 38% into the file. Characters are read from the relevance-enhanced text file beginning with the corresponding starting location and passed to the character generator until the screen is filled, while concurrently counting the relevance markers within the text file. Note the existence of relevance markers within the text file would normally be ignored when determining position for the corresponding starting location. They would also be ignored in counting the number of characters displayed for purposes of filling the screen. However, they are not ignored, but rather counted, when determining the number of relevance markers in a segment of text 420. Once the number of relevance markers is determined for a particular segment of text, a system attribute, such as the color of an object displayed will be altered to reflect the number of those markers that would be displayed on the screen if the scrolling were stopped at that point 430. Other system attributes include sound and a selection of an object displayed.

Figure 5:
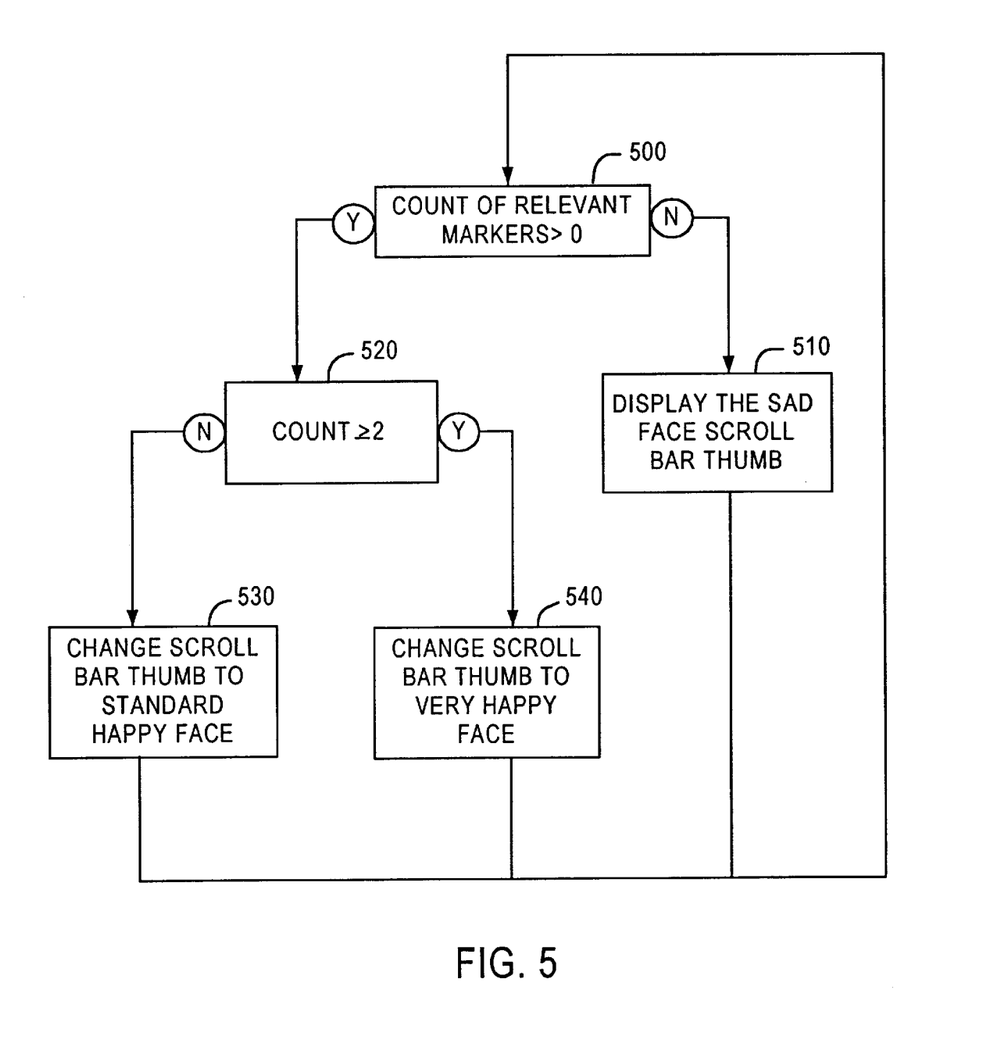
FIG. 5 is a flow chart of one embodiment of a process for altering a display to reflect the relevance of a portion of a document that would be visible at a scrolling location.
Figure 6:
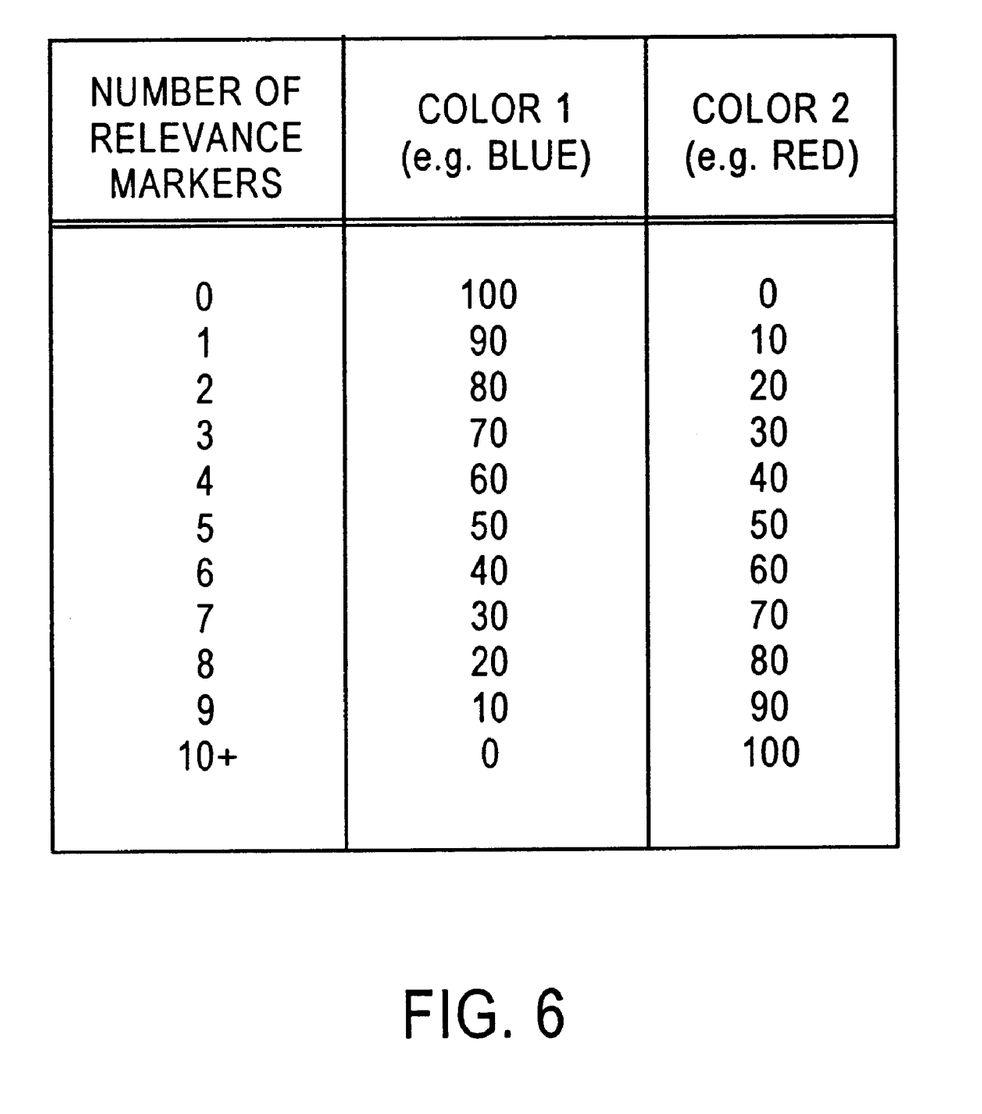
FIG. 6 is a look up table which can be used to set color based on a number of relevance markers that would be visible at a given scrolling location.

FIG. 5 is a flow chart of one embodiment of a process for altering a display to reflect the relevance of portions of a document that would be visible at a scrolling location. If the count of relevance markers is zero (400-N), a sad face is displayed in the scroll bar thumb (410). If the count is greater than zero (410-Y), a check is made to see if the count is greater than or equal to two (420). If it is not (420-N), the scroll bar thumb is changed to display a standard happy face (430). If the count is greater than or equal to two (420-Y), the scroll bar thumb will be changed to a very happy face (440). In a typical example the principal difference between a standard happy face and a very happy face resides in how big the smile is. In the implementation shown in FIG. 5, only three states are distinguishable corresponding to 0, 1 and more than 1 relevant terms for the location at which the scroll bar thumb is positioned. However, it is possible to have more than three symbols for distinguishing states. For example, color can be utilized to form a continuous indicator of the amount of relevance. For example, at one extreme the color blue, indicating relatively fewer relevance markers, can be compared with the other extreme at which a color red indicates a very large number of relevance markers. Shades of color between the two extremes can be generated by mixing the two colors in various proportions. Such an approach is shown in FIG. 6. Alternatively, a sound could be used to indicate the amount of relevant content at a particular location. The pitch of the sound could be adjusted to reflect how much relevant content is at a scrolling location. This is somewhat analogous to the "getting warmer," "getting colder" game.

FIG. 6 is a look up table which can be used to set color based on a number of relevance markers that would be visible at a given scrolling location. Although only ten different conditions are distinguished in the table shown in FIG. 6, it is clear that the amount of mixing of color 1 with color 2 can be a continuous function. As shown, the number of relevance markers ranges from 0 through 10 or more. The percentage of blue color for each of the states specified in the look up table varies as shown in the second column. Exemplary values for the color red mixed with the corresponding amount of blue are also shown.

Figure 7:
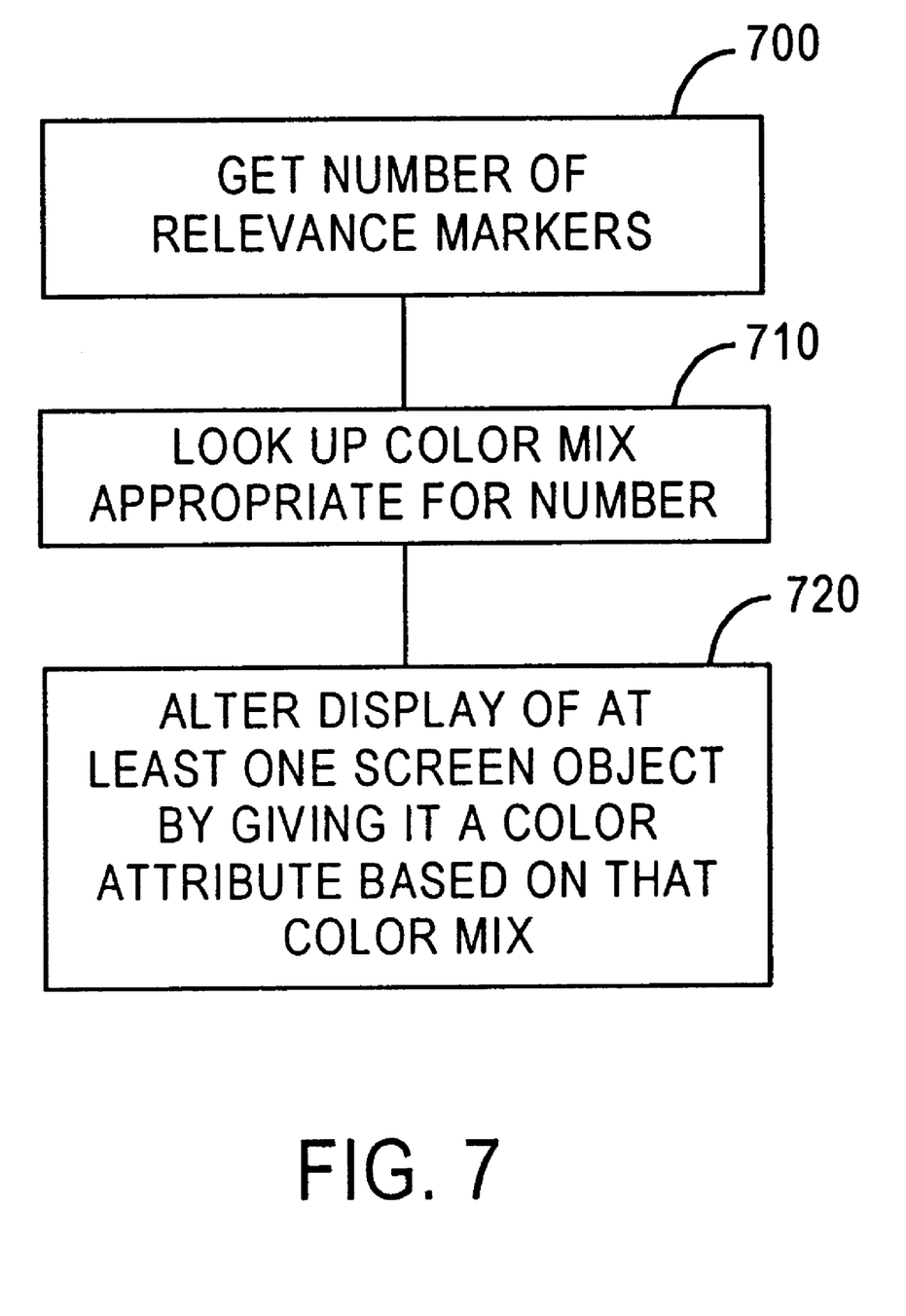
FIG. 7 is a flow chart of an exemplary process for setting color of an on-screen object based on relevance.

FIG. 7 is flow chart of an exemplary process for setting color of a screen object based on relevance. Which particular screen object is utilized to feedback the amount of the relevance is somewhat arbitrary. However, it is preferred that either the scroll thumb itself or the entire scroll bar have its color changed to reflect the amount of relevance detected at a given scroll thumb location.

When the number of relevance marks at a given scroll thumb location has been determined (700), one can look up the color mix appropriate for that number from the look up table shown in FIG. 6 (710). Then the display of at least one on screen object is altered by giving it a color attribute based on the color mix from the table (720). The smiley face combined with the color approach is particularly effective since the cursor may partially obscure the smiley face.

In the manner described, one can quickly identify the portions of a document containing relevant material to a search query or a find operation without needing to stop and examine irrelevant portions of the text.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A computer, comprising:
   a. a processor; and
   b. a graphical user interface, running on said processor, said graphical user interface providing a visual indication of the amount of relevant information at different scrolling locations in a document, wherein a plurality of objects are selectively displayed, each representing different amounts of relevant information at a particular scrolling location.

2. The computer of claim 1 in which the color of an object changes to reflect the amount of relevant information at a particular scrolling location.

3. The computer of claim 1 in which an audible sound is produced which changes to reflect the amount of relevant information at a particular scrolling location.

4. A computer, comprising:
   a. a memory; and
   b. a processor configured to submit an information retrieval query, store the terms of that query in said memory and add one or more relevance markers to information retrieved in response to that query.

5. The computer of claim 4 in which the information retrieval query is sent over a network.

6. The computer of claim 4 in which said one or more relevance markers is an extension to a set of HTML tags.

7. The computer of claim 6 in which a relevance marker is an attribute extending an existing HTML tag.

8. A computer implemented method of displaying information retrieved in response to a query, comprising the steps of:
   a. determining the amount of relevant information at a particular scrolling location; and
   b. displaying a plurality of objects to indicate said amount of relevant information, wherein each object represents different amounts of relevant information at a particular scrolling location.

9. The method of claim 8 in which color of an object changes to reflect the amount of relevant information at a particular scrolling location.

10. The method of claim 8 in which sound produced by said system is said system attribute.

11. A computer implemented method of retrieving information, comprising the steps of:
    a. submitting a query to a search engine;
    b. storing the terms of that search;
    c. retrieving information from said search engine in response to said query; and
    d. if information retrieved from said search engine contains no relevance markers, adding relevance markers to the information retrieved.

12. The method of claim 11 further comprising the step of:
    modifying an attribute of the system to indicate the amount of relevant information at a particular cursor location.

13. A method of identifying relevant information retrieved in response to a query, comprising the steps of:
    a. identifying query terms in the information retrieved using stored query terms; and
    b. inserting a relevance marker adjacent each query term identified.

14. A method of identifying the amount of relevant information which is or would be visible at a particular scrolling location, comprising the steps of:
    a. counting a number of relevance markers contained in the information that is displayed or that would be displayed at that location; and
    b. altering a system attribute to reflect said number.

15. A system for retrieving information, comprising:
    a. a network;
    b. at least one server connected to said network;
    c. at least one user computer connected to said network; and
    d. at least one user computer configured to retrieve information from a server and to display an indication of how much relevant information is at a particular scrolling location.

16. A computer program product, comprising:
    a. a memory medium;
    b. a computer program, stored on said memory medium, said computer program containing instructions for displaying a plurality of objects with each object representing different amounts of relevant information at a particular scrolling location.

17. The computer program product of claim 16 in which color of an object changes to reflect the amount of relevant information at a particular scrolling location.

* * * * *